(12) United States Patent
Liu

(10) Patent No.: US 10,024,576 B2  
(45) Date of Patent: Jul. 17, 2018

(54) WATER HEATER

(71) Applicant: Xiu-Jin Liu, Taichung (TW)

(72) Inventor: Xiu-Jin Liu, Taichung (TW)

( * ) Notice: Subject to any disclaimer, the term of this patent is extended or adjusted under 35 U.S.C. 154(b) by 136 days.

(21) Appl. No.: 15/285,877

(22) Filed: Oct. 5, 2016

(65) Prior Publication Data

US 2018/0094834 A1 Apr. 5, 2018

(51) Int. Cl.
*F24J 2/00* (2014.01)
*F24H 1/00* (2006.01)

(52) U.S. Cl.
CPC .......... *F24J 2/0023* (2013.01); *F24H 1/0018* (2013.01); *F24H 1/00* (2013.01)

(58) Field of Classification Search
CPC .......... F24H 1/00; F24H 1/0018; F24H 2/0023
USPC ........................................ 126/612, 610, 639
See application file for complete search history.

(56) References Cited

U.S. PATENT DOCUMENTS

| | | | | |
|---|---|---|---|---|
| 4,050,445 A | * | 9/1977 | Huse .................. | F24J 2/402 126/590 |
| 4,458,669 A | * | 7/1984 | Lee .................... | F24D 11/003 126/570 |
| 4,639,293 A | * | 1/1987 | Lew .................... | C02F 1/046 202/205 |
| 7,296,410 B2 | * | 11/2007 | Litwin ................ | F03G 6/065 60/641.12 |
| 7,798,410 B2 | * | 9/2010 | Carlson .............. | G06K 7/10554 235/459 |
| 2002/0112719 A1 | * | 8/2002 | Yogev ................. | F24J 2/07 126/639 |
| 2007/0235022 A1 | * | 10/2007 | Harrison ............. | F24D 3/08 126/640 |
| 2014/0284201 A1 | * | 9/2014 | Remmert ........... | B01D 1/0035 203/22 |
| 2016/0232997 A1 | * | 8/2016 | Kim .................... | G21D 1/00 |

* cited by examiner

*Primary Examiner* — Gregory Huson
*Assistant Examiner* — Nikhil Mashruwala
(74) *Attorney, Agent, or Firm* — Muncy, Geissler, Olds & Lowe, P.C.

(57) ABSTRACT

The water heater includes a main body and a secondary tank. The main body encloses a receiving space and absorbs solar energy to heat water therein. The main body has a first inlet, a first outlet, and a steam outlet. The secondary tank includes a tank having a second inlet, a second outlet, and a steam inlet. The second outlet communicates with the first inlet of the main body via an inlet pipe, and the steam inlet communicates with the steam outlet of the main body via the steam pipe. Water enters the tank via the second inlet and enters the main body via the inlet pipe. Steam produced by the heated water in the main body enters the tank via the steam pipe to be further discharged or to condense into liquid water. The liquid water enters the main body again via the inlet pipe.

9 Claims, 6 Drawing Sheets

WATER HEATER

BACKGROUND OF THE INVENTION

Field of the Invention

The present invention relates to a water heater.

Description of the Prior Art

A conventional water heater, such as solar energy heater or electric heater, discharges water steam by steam discharging holes or other similar structures. However, the efficiency of discharging is too low so that the heater has a risk of explosion.

In addition, it is dangerous that the steam may make users burn. Besides, the steam is discharged into the air. That is, the steam makes the amount of water decrease.

Thus, the safety and water cost of water heaters are to be improved.

SUMMARY OF THE INVENTION

The main object of the present invention is to provide a water heater which is able to discharge steam and to recycle it.

To achieve the above and other objects, a water heater of the present invention includes a main body and a secondary tank.

The main body encloses a receiving space and is able to absorb solar energy to heat water in the receiving space. The main body has at least one first inlet, at least one first outlet, and at least one steam outlet.

The secondary tank includes a tank. The tank has at least one second inlet, at least one second outlet, and at least one steam inlet. The second inlet is adapted for communicating with a water source. The second outlet communicates with the first inlet of the main body via an inlet pipe, and the steam inlet communicates with the steam outlet of the main body via the steam pipe.

Water to be heated enters the tank via the second inlet and further enters the main body via the inlet pipe. Steam produced by the heated water in the main body enters the tank via the steam pipe to be further discharged or to condense into liquid water. The liquid water enters the main body again via the inlet pipe.

Thereby, the steam can be condensed into liquid water for recycling, and excess steam can be discharged. Thus, the risk of steam explosion is avoided, and the steam can be collected for use.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figures 1, 1A:
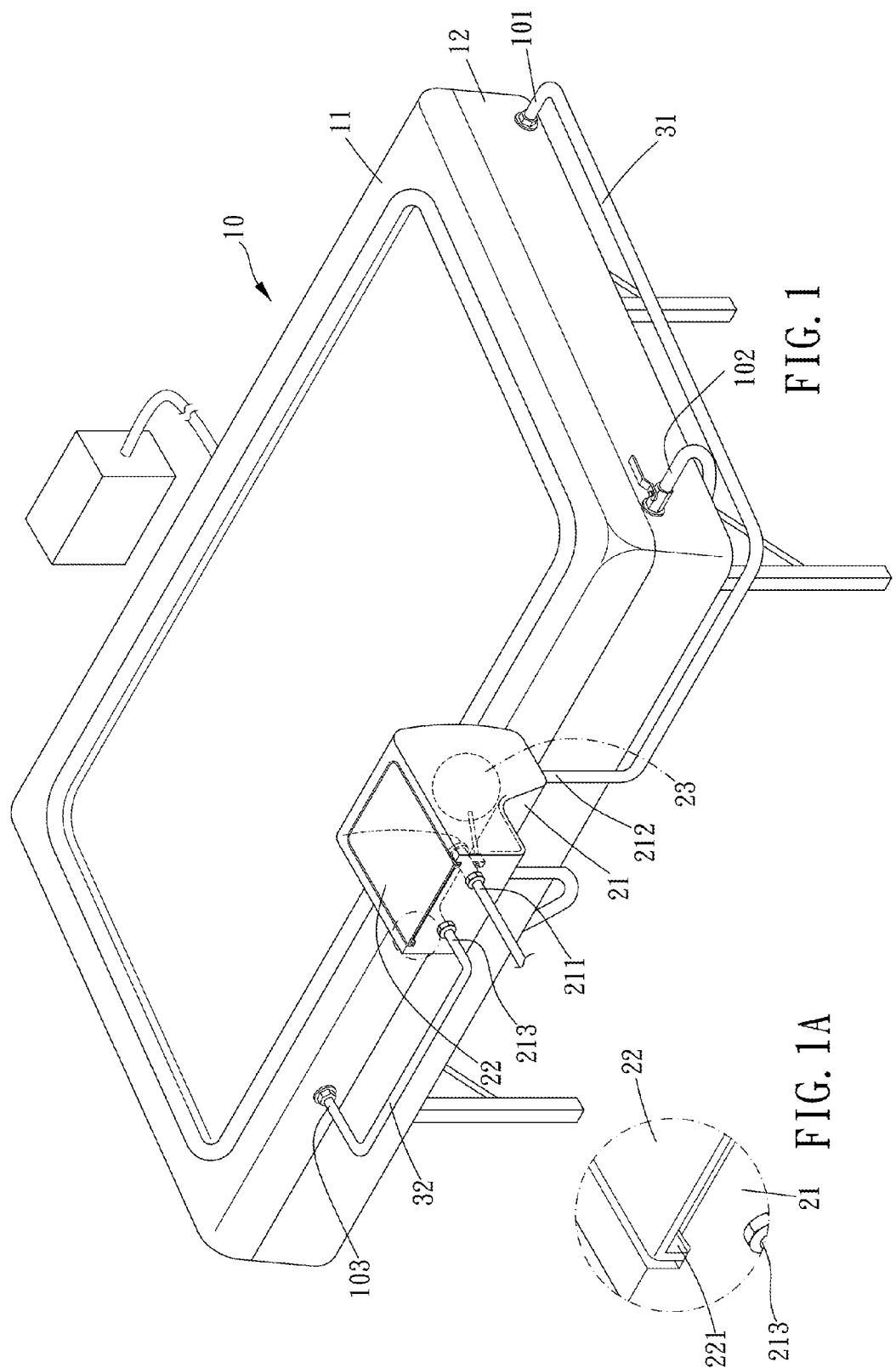
FIG. 1 is a stereogram of the present invention.
FIG. 1A is a partial enlargement of FIG. 1.
Figure 2:
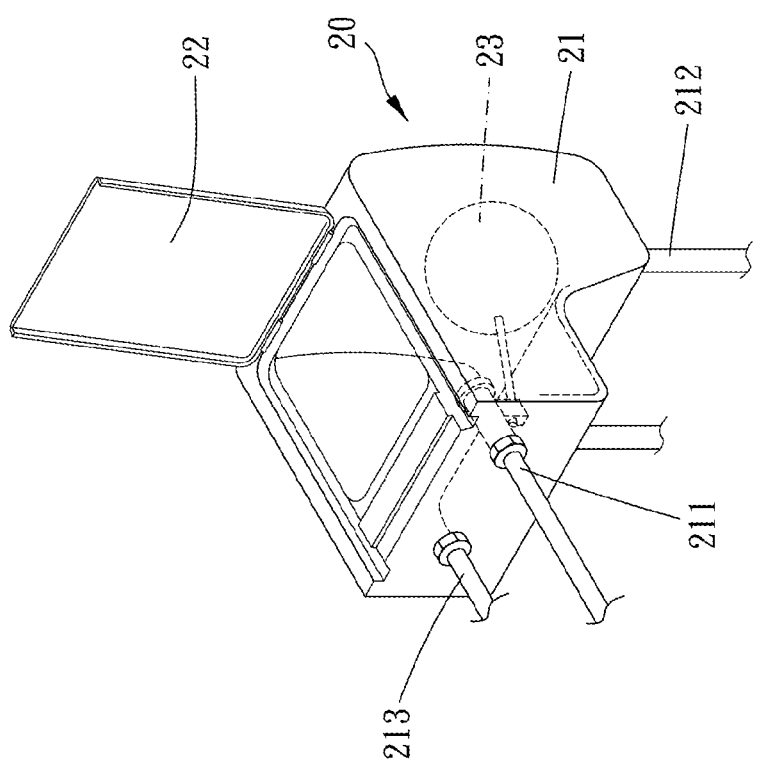
FIG. 2 is a stereogram showing a secondary tank of the present invention.
Figure 3:
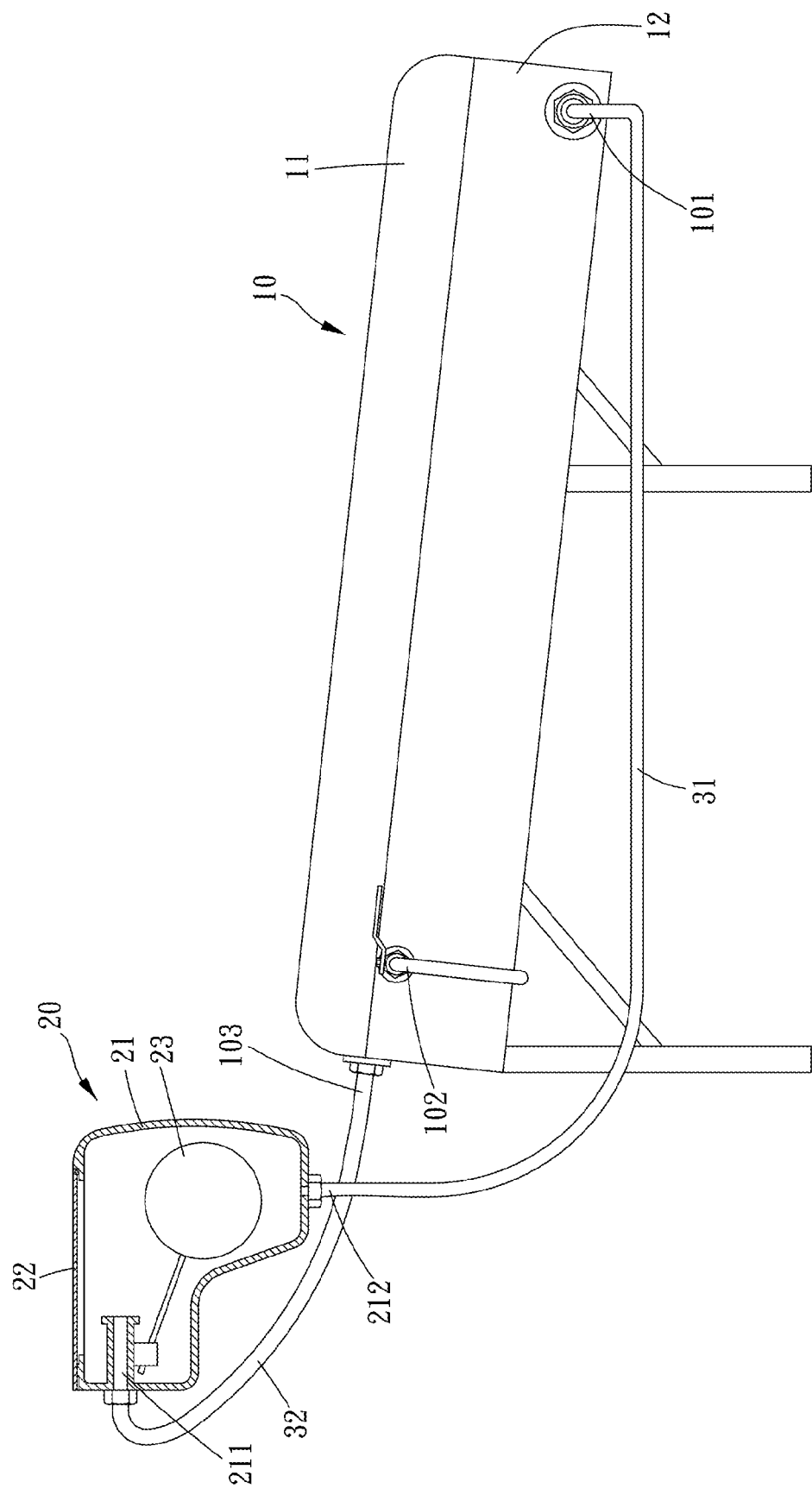
FIG. 3 is a front view of the present invention.
Figure 4:
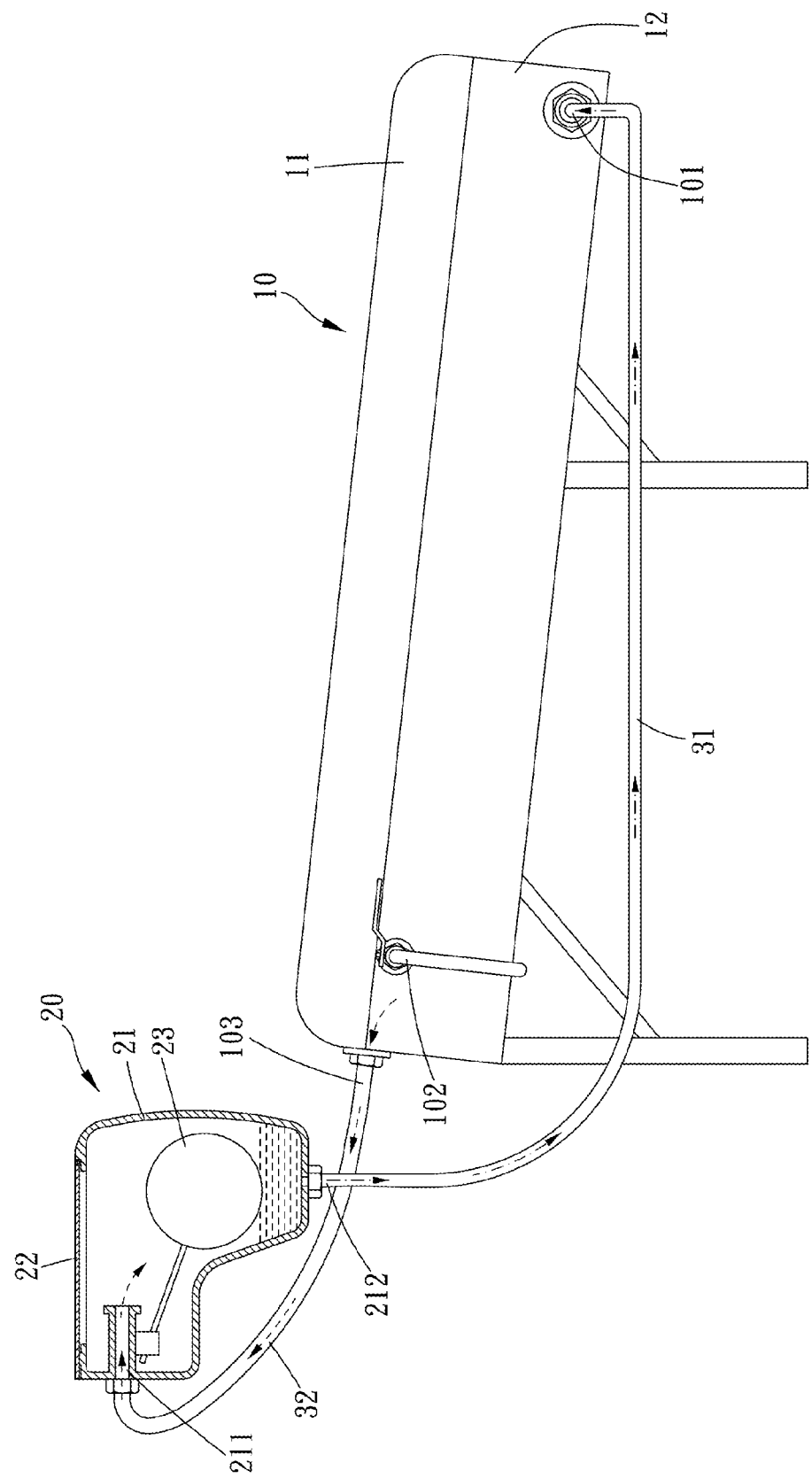
FIG. 4 is an illustration of working of the present invention.
Figure 5:
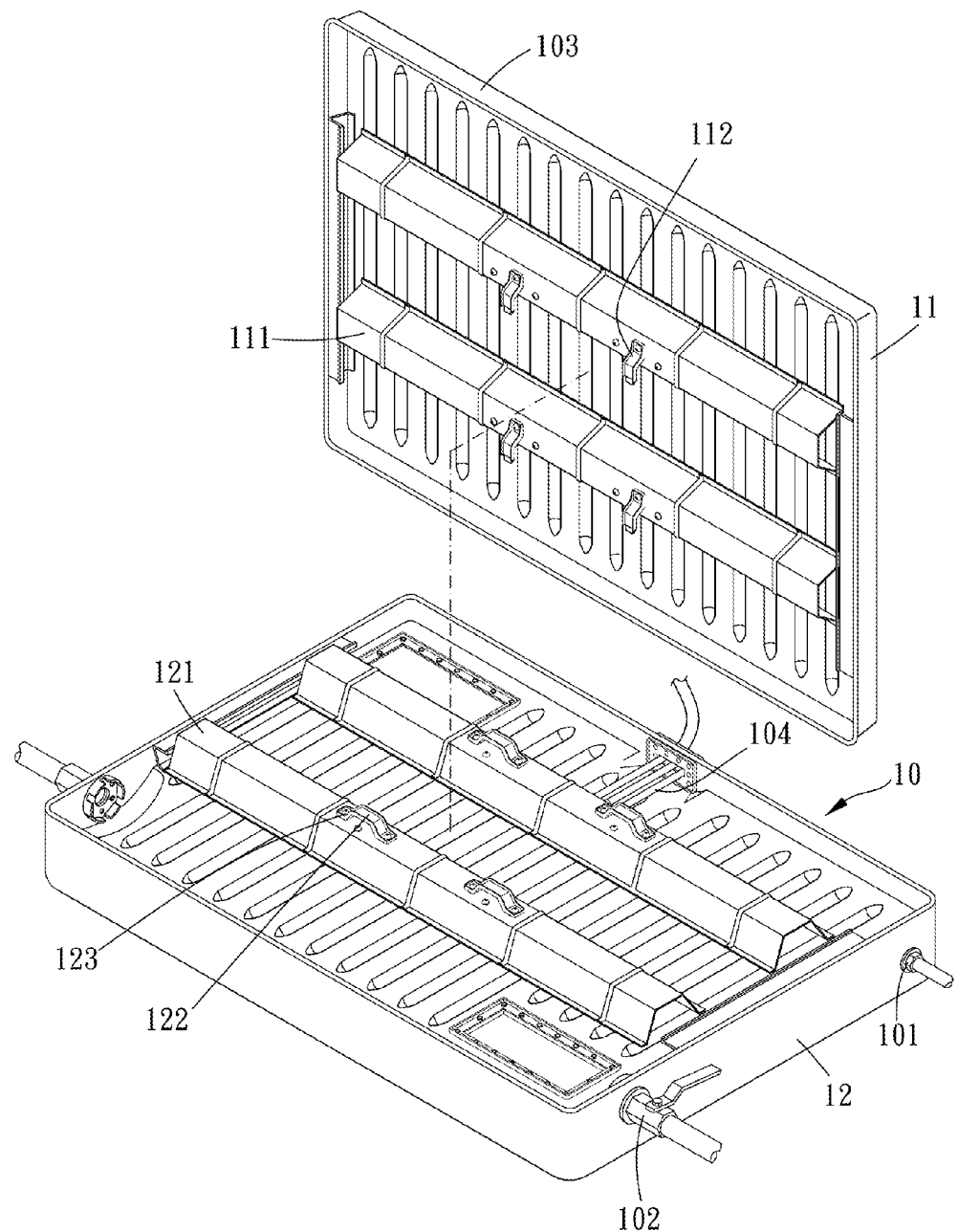
FIG. 5 is a breakdown drawing showing a main body of the present invention.
Figure 5A:
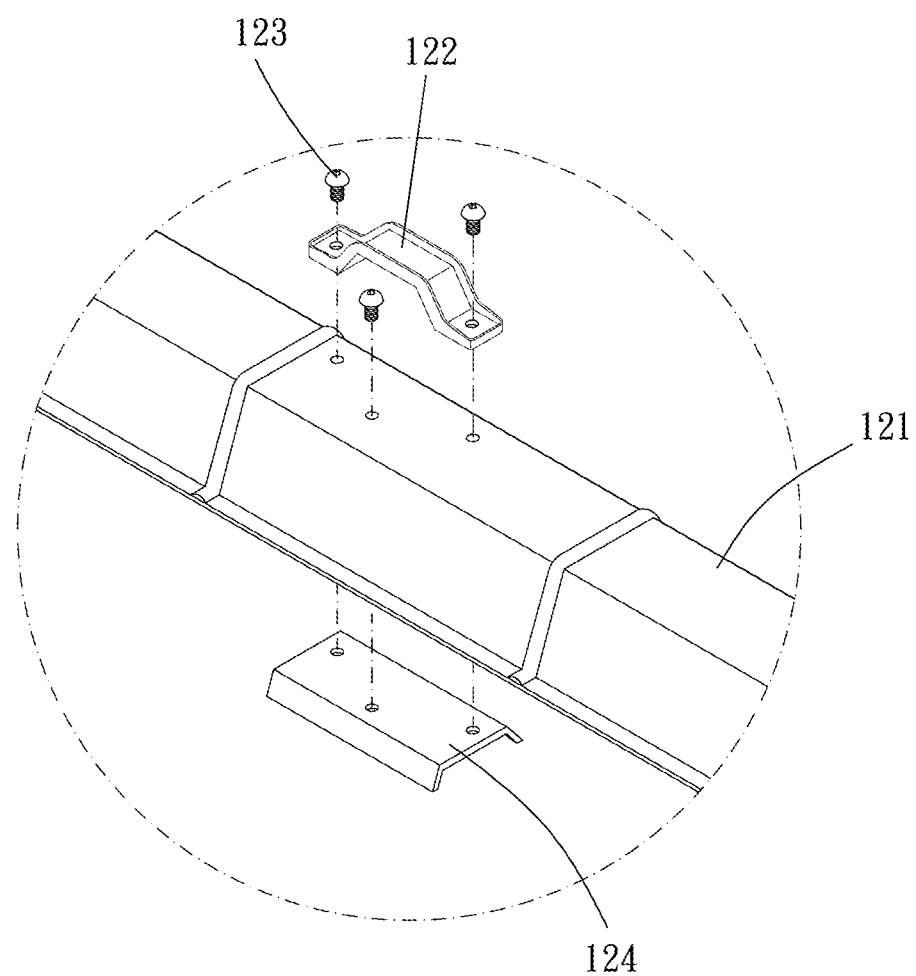
FIG. 5A is a further breakdown drawing of FIG. 5.

Please refer to FIG. 1 to FIG. 5, FIG. 1A, and FIG. 5A, the water heater of the present invention includes a main body 10 and a secondary tank 20.

The main body 10 encloses a receiving space and is able to absorb solar energy to heat water in the receiving space. The main body 10 has at least one first inlet 101, at least one first outlet 102, and at least one steam outlet 103. In the present embodiment, the main body 10 further has an electric water heater 104 arranged therein as a secondary heating device.

The secondary tank 20 includes a tank 21. The tank 21 has at least one second inlet 211, at least one second outlet 212, and at least one steam inlet 213. The second inlet 211 is adapted for communicating with a water source. The second outlet 212 communicates with the first inlet 101 of the main body 10 via an inlet pipe 31. The steam inlet 213 communicates with the steam outlet 103 of the main body 10 via a steam pipe 32.

Water to be heated enters the tank 21 via the second inlet 211 and further enters the main body 10 via the inlet pipe 31. Steam produced by the heated water in the main body 10 enters the tank 21 via the steam pipe 32 to be further discharged or to condense into liquid water. The liquid water enters the main body 10 again via the inlet pipe 31.

In the present embodiment, the secondary tank 20 further includes a cover 22. The tank 21 has an opening. The cover 22 selectively covers the opening. When the cover 22 covers the opening, a gap 221 is formed between the cover 22 and the tank to discharge excess steam. Besides, the secondary tank 20 further includes a ball float 23 and a valve. The ball float 23 is arranged in the tank 21. The valve is arranged in the second inlet 211. The ball float 23 is connected to the valve. When the ball float 23 is elevated by water to a specific position, the valve is closed to shut the second inlet 211.

In view of the main body 10, in the present embodiment, the main body 10 includes two half-shells 11,12. Each half-shell 11,12 has an arched beam 111,121 on an inner surface thereof. The beam 111,121 has at least one engaging member 112,122 on a top thereof. The two half-shells 11,12 are combined together. The receiving space is enclosed by the inner surface of the two half-shells 11,12. The engaging members 112,122 are engaged with each other so that the two half-shells 11,12 are unable to be disconnected easily. Preferably, the two half-shells 11,12 are made of metal, and fringes of the two half-shells 11,12 are engaged together by welding.

More specifically, one of the two engaging members 122 is arched and enclosing an engaging hole. The other one of the two engaging members 112 is step-shaped to insert into the engaging hole. Two sides of a top face of each engaging member 112,122 are formed with blocking flanges which are erected. Preferably, each half-shell 11,12 further includes a positioning plate 124. The positioning plate 124 is disposed on a face of the beam 111,121 facing to the half-shell 11,12 and positionally corresponds to the engaging member 112, 122. The engaging member 112,122 and the positioning plate 124 are fixed together by a positioning member 123 so that the beam 111,121 is sandwiched by the engaging member 112,122 and the positioning plate 124 therebetween.

Preferably, the main body 10 has a large top face to absorb solar energy.

In use, water to be heated enters the secondary tank 20 via the second inlet 211 and further enters the main body 10 via the inlet pipe 31. The water is heated in the main body 10 by the solar energy. If solar energy is not sufficient, the electric water heater 104 can help heat the water. When the steam is generated, it can be discharged via the steam pipe 32 into the secondary tank 20. The steam is cooled and condensed into liquid water. The liquid water may enter the main body 10 again via the inlet pipe 31. In addition, the excess steam can be discharged from the gap 221 between the cover 22 and the tank 21 to avoid explosion. When the ball float 23 is elevated to a specific position by water, the valve shuts the water inlet.

In conclusion, the water heater of the present invention can prevent steam explosion, and the steam can be collected and recycled. Thus, it improves safety and is water-saving.

What is claimed is:

1. A water heater, including:
   a main body, enclosing a receiving space, being able to absorb solar energy to heat water in the receiving space, the main body having at least one first inlet, at least one first outlet, and at least one steam outlet;
   a secondary tank, including a tank, the tank having at least one second inlet, at least one second outlet, and at least one steam inlet, the second inlet being adapted for communicating with a water source, the second outlet communicating with the first inlet of the main body via an inlet pipe, the steam inlet communicating with the steam outlet of the main body via the steam pipe;
   wherein water to be heated enters the tank via the second inlet and further enters the main body via the inlet pipe, steam produced by the heated water in the main body enters the tank via the steam pipe to be further discharged or to condense into liquid water, the liquid water enters the main body again via the inlet pipe.

2. The water heater of claim 1, wherein the secondary tank further includes a cover, the tank has an opening, the cover selectively covers the opening, a gap is formed between the cover and the tank to discharge steam when the cover covers the opening.

3. The water heater of claim 1, wherein the main body further has an electric water heater arranged therein.

4. The water heater of claim 1, wherein the secondary tank further includes a ball float and a valve, the ball float is arranged in the tank, the valve is arranged in the second inlet, the ball float is connected to the valve, the valve is closed to shut the second inlet when the ball float is elevated by water to a specific position.

5. The water heater of claim 1, wherein the main body includes two half-shells, each half-shell has an arched beam on an inner surface thereof, the beam has at least one engaging member on a top thereof, the two half-shells are combined together, the engaging members are engaged with each other so that the two half-shells are unable to be disconnected easily.

6. The water heater of claim 5, wherein the two half-shells are made of metal, fringes of the two half-shells are engaged together by welding.

7. The water heater of claim 5, wherein one of the two engaging members is arched and enclosing an engaging hole, the other one of the two engaging members is step-shaped to insert into the engaging hole.

8. The water heater of claim 7, wherein two sides of a top face of each engaging member are formed with blocking flanges which are erected.

9. The water heater of claim 5, wherein each half-shell further includes a positioning plate, the positioning plate is disposed on a face of the beam facing to the half-shell and positionally corresponds to the engaging member, the engaging member and the positioning plate are fixed together by a positioning member so that the beam is sandwiched by the engaging member and the positioning plate therebetween.

\* \* \* \* \*